United States Patent
Ishikawa et al.

(10) Patent No.: US 8,738,274 B2
(45) Date of Patent: May 27, 2014

(54) CONTROL APPARATUS FOR INTERNAL COMBUSTION ENGINE

(75) Inventors: Shinichi Ishikawa, Takanezawa-machi (JP); Kazuhito Tokugawa, Takanezawa-machi (JP)

(73) Assignee: Keihin Corporation, Shinjuku-Ku, Tokyo (JP)

(*) Notice: Subject to any disclaimer, the term of this patent is extended or adjusted under 35 U.S.C. 154(b) by 1115 days.

(21) Appl. No.: 12/719,832

(22) Filed: Mar. 8, 2010

(65) Prior Publication Data
US 2010/0235075 A1   Sep. 16, 2010

(30) Foreign Application Priority Data

Mar. 16, 2009 (JP) .................................. 2009-063205
Mar. 16, 2009 (JP) .................................. 2009-063206

(51) Int. Cl.
*F02D 17/04* (2006.01)
*F02D 41/04* (2006.01)
*B60K 28/14* (2006.01)

(52) U.S. Cl.
CPC .............. *F02D 17/04* (2013.01); *F02D 41/042* (2013.01); *B60K 28/14* (2013.01)
USPC ...................................... 701/112; 123/198 D

(58) Field of Classification Search
CPC ......... F02D 17/04; F02D 41/042; B60K 28/14
USPC ..... 123/198 D, 198 DB, 198 DC, 481, 179.4; 701/107, 112; 180/282–285; 340/440
See application file for complete search history.

(56) References Cited

U.S. PATENT DOCUMENTS

| 4,213,513 A | * | 7/1980 | Beck | 180/272 |
| 6,612,881 B2 | * | 9/2003 | Kanno | 440/1 |
| 7,489,232 B2 | * | 2/2009 | Hata | 340/5.72 |
| 8,170,753 B2 | * | 5/2012 | Kawamura et al. | 701/45 |

FOREIGN PATENT DOCUMENTS

| EP | 1184233 A1 | 3/2002 |
| EP | 2026287 A2 | 2/2009 |
| JP | 2002-071703 | 3/2002 |
| JP | 2004093537 | 3/2004 |
| JP | 2005-337148 | 8/2005 |
| JP | 2006-029294 | 2/2006 |

OTHER PUBLICATIONS

Decision of Final Rejection, by the Japanese Patent Office dated Mar. 27, 2013, Office action with English translation.
Notification of Grounds for Rejection for JP2009-063205, Sep. 5, 2012.
Kyriakides, Leonidas, European Search Report, pp. 1-5, Jun. 30, 2010.

* cited by examiner

*Primary Examiner* — Hai Huynh
(74) *Attorney, Agent, or Firm* — Lau & Associates, LLC.

(57) ABSTRACT

In an apparatus for controlling an internal combustion engine mounted on a vehicle, it is configured to have a falling signal generator that generates a falling signal indicative of falling of the vehicle when the vehicle falls; an operation stopper that stops operation of the engine in response to the generated falling signal; and a suspender that suspends processing of the operation stopper to stop the operation of the engine until a predetermined time period elapses. With this, when the falling of the vehicle is not serious and the operator lifts the vehicle body within the predetermined time period, the operator can restart the vehicle to drive immediately after lifting the vehicle body.

6 Claims, 9 Drawing Sheets

CONTROL APPARATUS FOR INTERNAL COMBUSTION ENGINE

BACKGROUND OF THE INVENTION

1. Field of the Invention

This invention relates to a control apparatus for an internal combustion engine, more particularly to an apparatus for controlling the operation of an internal combustion engine when a vehicle falls.

2. Description of the Related Art

When a vehicle (e.g., motorcycle) falls, the lean of the vehicle may adversely affect pressurized circulation of lubricating oil of an internal combustion engine and result in damage of the engine. To cope with it, Japanese Laid-Open Patent Application No 2002-71703 (paragraph 0021, 0022, FIG. 3, etc.) discloses a control system for an internal combustion engine that controls the engine operation to immediately stop upon falling of the vehicle.

SUMMARY OF THE INVENTION

In the case that falling of the vehicle is not serious, however, the operator or driver can lift the vehicle body easily and quickly and it is unlikely to cause the above-mentioned damage. Despite this, if adopting the configuration of the reference to immediately stop the engine operation upon falling, even though the falling is not serious, the operator has to restart the engine (i.e., manipulate a starter lever or kick starter pedal) after lifting the vehicle body and it is bothersome.

Further, in a time trial race, etc., such the restart operation results in great time loss. Also, in an off-road race, the vehicle often falls and the repeated restart operations become a great physical burden for the operator. Hence, it is preferable to configure a control apparatus for an internal combustion engine (especially for a racing engine) of a vehicle such that the vehicle can be quickly restarted to travel without stopping the engine operation, when falling of the vehicle is not serious.

An object of this invention is therefore to overcome the foregoing drawbacks by providing a control apparatus for an internal combustion engine that can quickly restart a vehicle to drive, while preventing the engine from being damaged, when the vehicle falls.

In order to achieve the first object, this invention provides an apparatus for controlling an internal combustion engine mounted on a vehicle, comprising a falling signal generator that generates a falling signal indicative of falling of the vehicle when the vehicle falls; an operation stopper that stops operation of the engine in response to the generated falling signal; and a suspender that suspends processing of the operation stopper to stop the operation of the engine until a predetermined time period elapses.

BRIEF DESCRIPTION OF THE DRAWINGS

The above and other objects and advantages of the invention will be more apparent from the following description and drawings in which.

DETAILED DESCRIPTION OF THE PREFERRED EMBODIMENTS

A control apparatus for an internal combustion engine according to preferred embodiments of the present invention will now be explained with reference to the attached drawings.

Figure 1:
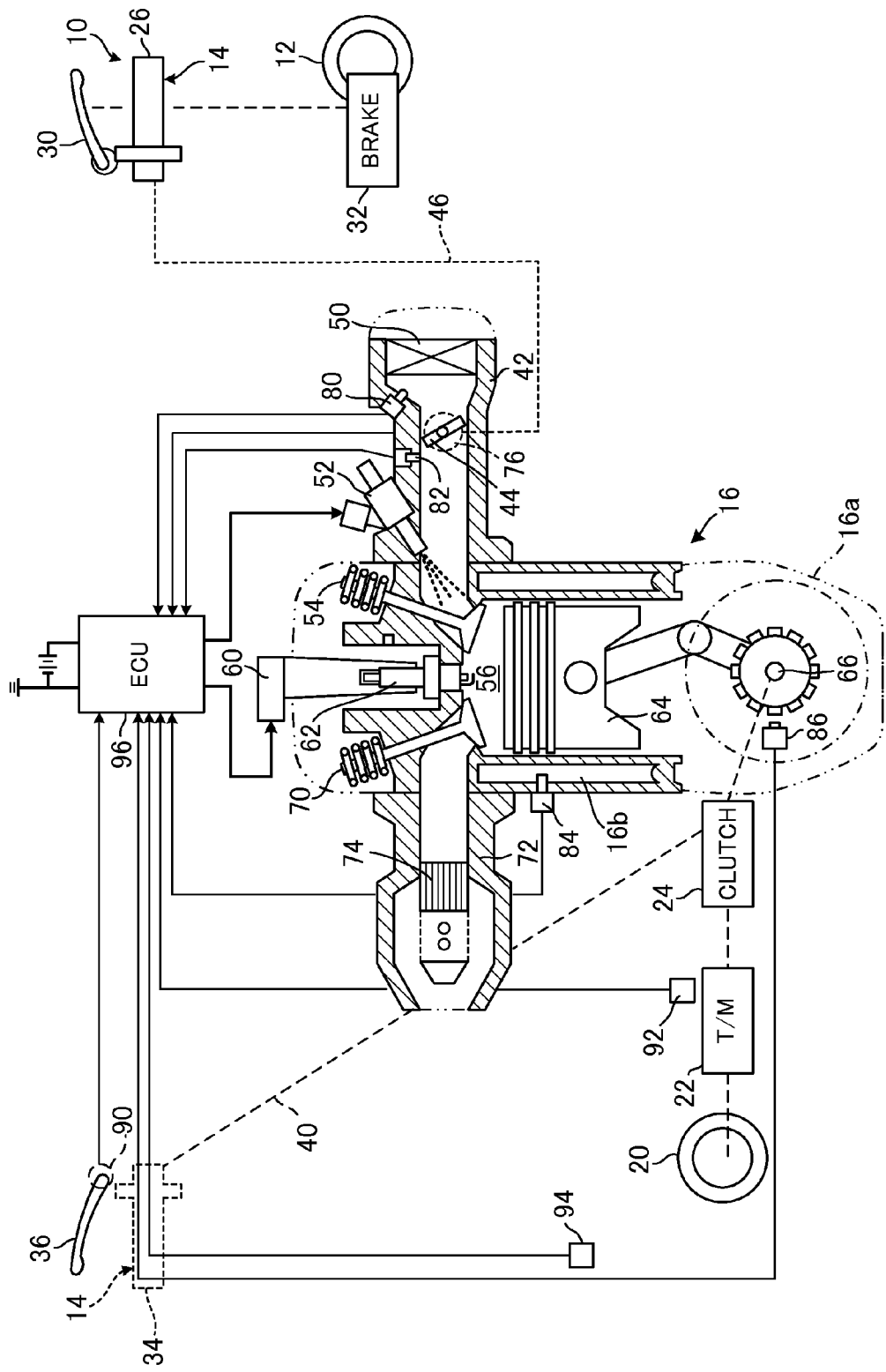
FIG. 1 is an overall view schematically showing a control apparatus for an internal combustion engine according to a first embodiment of this invention.

FIG. 1 is an overall view schematically showing a control apparatus for an internal combustion engine according to a first embodiment of this invention.

In FIG. 1, a vehicle (i.e., motorcycle) is designated by the symbol 10. The vehicle 10 is equipped with a handlebar 14 attached to the upper end of a telescopic fork (not shown) of a front wheel 12, an internal combustion engine 16 installed at the middle of a frame (not shown), and a rear wheel 20 attached to the rear end of the frame through a rear shock absorber (not shown).

The output of the engine 16 is varied in rotational speed by a transmission 22 (designated T/M in the drawing) and sent to the rear wheel 20 to drive the vehicle 10. The transmission 22 is a manual transmission with a plurality of, i.e., five forward gear speeds. A clutch 24 is interposed between the engine 16 and the transmission 22 and, when operated, makes or breaks the connection between the engine 16 and the transmission 22 to transmit or not transmit the engine output.

The right end of the handlebar 14 (as viewed by the operator) is equipped with a throttle grip (accelerator) 26 to be operable by the operator, and with a front wheel brake lever 30 to be operable by the operator. The front wheel brake lever 30 is mechanically connected to a front wheel brake 32 through a hydraulic cylinder (not shown) and, when operated (gripped) by the operator, operates the front wheel brake 32 to brake the front wheel 12.

The left end of the handlebar 14 is equipped with a grip 34 that the operator can grip and with a clutch lever 36. The clutch lever 36 is mechanically connected to the clutch 24 thorough a clutch cable 40. When operated (gripped) by the operator, the clutch lever 36 operates the clutch 24 to make or break, i.e., connect or disconnect, power transmission from the engine 16 to the transmission 22. A shift lever (not shown) is provided near a foot step on the lower left side of the frame, which the operator moves up and down by foot to select one gear speed (gear position or gear ratio) among the five forward gear speeds.

The engine 16 is a 4-cycle, single-cylinder, water-cooled gasoline engine having a displacement of around 250 cc. Symbol 16a designates a crankcase of the engine 16.

A throttle valve 44 installed in an air intake pipe 42 of the engine 16. The throttle valve 44 is mechanically connected to the throttle grip 26 through a throttle wire 46 and opened and closed in accordance with the amount of manipulation of the throttle grip 26 to regulate the amount of intake air that enters through an air cleaner 50 to flow through the air intake pipe 42.

An injector 52 is installed at the air intake pipe 42 near an intake port located downstream of the throttle valve 44 for injecting gasoline fuel into the intake air regulated by the throttle valve 44. The injected fuel mixes with intake air to form an air-fuel mixture that flows into a combustion chamber 56 when an intake valve 54 is opened.

The air-fuel mixture flowing into the combustion chamber 56 is ignited to burn by a spark discharge from a spark plug 62 supplied with high voltage from an ignition coil 60, thereby driving a piston 64 downward in FIG. 1 to rotate a crankshaft 66. The crankshaft 66 is connected to a kick starter pedal (not shown) used for starting the engine 16.

When an exhaust valve 70 is opened, the exhaust gas produced by the combustion passes through an exhaust pipe 72. The exhaust pipe 72 is installed with a catalytic converter 74 for removing harmful components of the exhaust gas. The exhaust gas purified by the catalytic converter 74 continues to pass downstream to be discharged outside the engine 16.

A throttle opening sensor (throttle opening detector) 76 constituted of a potentiometer is provided near the throttle valve 44 and produces an output indicative of an opening TH of the throttle valve 44. An intake air temperature sensor 80 installed upstream of the throttle valve 44 of the air intake pipe 42 produces an output indicative of the temperature TA of the intake air, and an absolute pressure sensor 82 installed downstream thereof produces an output indicative of the absolute pressure (engine load) PBA in the air intake pipe.

A coolant temperature sensor 84 is attached to a coolant passage 16b of the cylinder block of the engine 16 and produces an output corresponding to the temperature (engine coolant temperature) TW of the engine 16. A crank angle sensor (engine speed detector) 86 installed near the crankshaft 66 of the engine 16 outputs a crank angle signal at a predetermined crank angle position.

A clutch switch (clutch engagement determiner) 90 is provided near the clutch lever 36 and produces an ON signal when the clutch lever 36 is manipulated by the operator (the clutch 24 is disengaged, i.e., is not connected) and an OFF signal when it is not manipulated (the clutch 24 is engaged).

A gear position sensor (speed ratio detector) 92 is connected to the transmission 22 and produces a signal indicative of a gear position selected by the transmission 22, i.e., a gear position selected from among the first to fifth gear positions. Since the transmission 22 is configured so that the five gear speeds are set with five speed ratios, respectively, the signal outputted from the gear position sensor 92 also indicates a current speed ratio of the transmission 22.

A tilt sensor (falling signal outputter) 94 is installed at an appropriate position of the frame of the vehicle 10. The tilt sensor 94 having a pendulum detects displacement of the pendulum from the vertical axis, specifically a tilt angle of the vehicle 10, and produces an ON signal indicating falling of the vehicle 10 when the detected tilt angle is equal to or greater than a predetermined tilt angle enabling to determine that the vehicle 10 has fell, while producing an OFF signal when it is less than the predetermined tilt angle.

The outputs of the foregoing sensors such as the throttle opening sensor 76 and tilt sensor 94 are sent to an electronic control unit (ECU) 96.

Figure 2:
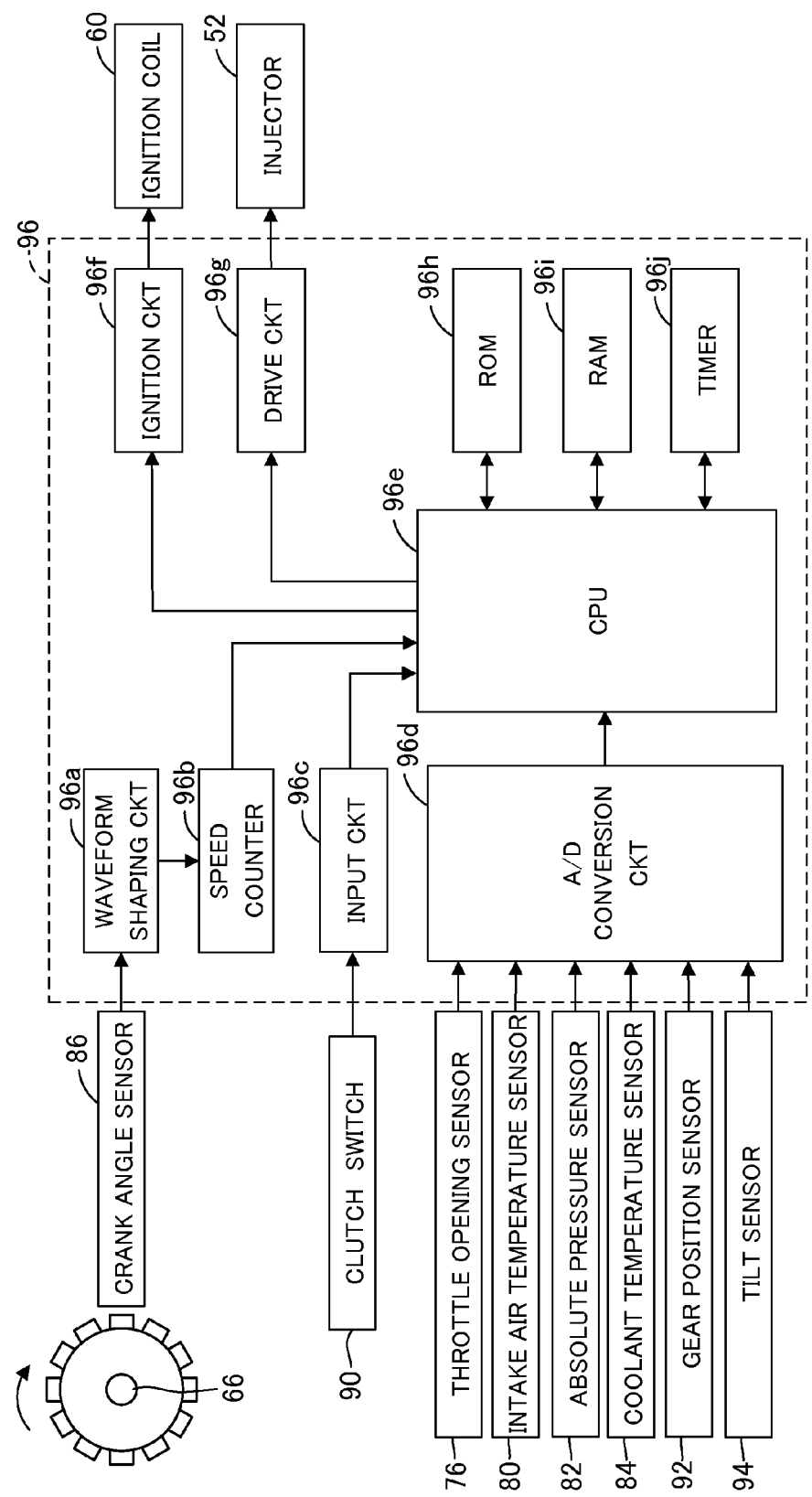
FIG. 2 is a block diagram showing an overall configuration of an electronic control unit shown in FIG. 1.

FIG. 2 is a block diagram showing an overall configuration of the ECU 96.

The ECU 96 comprises a microcomputer having a waveform shaping circuit 96a, speed counter 96b, input circuit 96c, A/D conversion circuit 96d, CPU 96e, ignition circuit 96f, drive circuit 96g, ROM 96h, RAM 96i and timer 96j.

The waveform shaping circuit 96a waveform-shapes outputs (signal waveform) from the crank angle sensor 86 into pulse signals to be outputted to the speed counter 96b. The speed counter 96b counts the inputted pulse signals to detect or calculate engine speed NE and sends a signal indicative of the engine speed NE to the CPU 96e.

The input circuit 96c is inputted with the ON/OFF signal from the clutch switch 90 and transmits a signal indicating a condition of the clutch 24, i.e., whether the clutch 24 is in engagement, to the CPU 96e. The A/D conversion circuit 96d receives the outputs of the sensors such as the throttle opening sensor 76 and converts an analog signal value to a digital signal value to be outputted to the CPU 96e.

Based on the inputted digital signal, etc., the CPU 96e carries out a calculation in accordance with a program stored in the ROM 96h, and sends an ignition control signal of the ignition coil 60 to the ignition circuit 96f, thereby conducting an ignition timing control. The CPU 96e similarly carries out a calculation based on the inputted signals in accordance with a program stored in the ROM 96h, and sends a fuel injection control signal to the drive circuit 96g, thereby conducting a fuel injection control.

The ignition circuit 96f ignites the engine 16 by supplying current to the ignition coil 60 in response to the ignition control signal from the CPU 96e. The drive circuit 96g drives the injector 52 in response to the fuel ignition control signal from the CPU 96e to inject the fuel. The timer 96j is used for time measurement in a program which is explained later.

Figure 3:
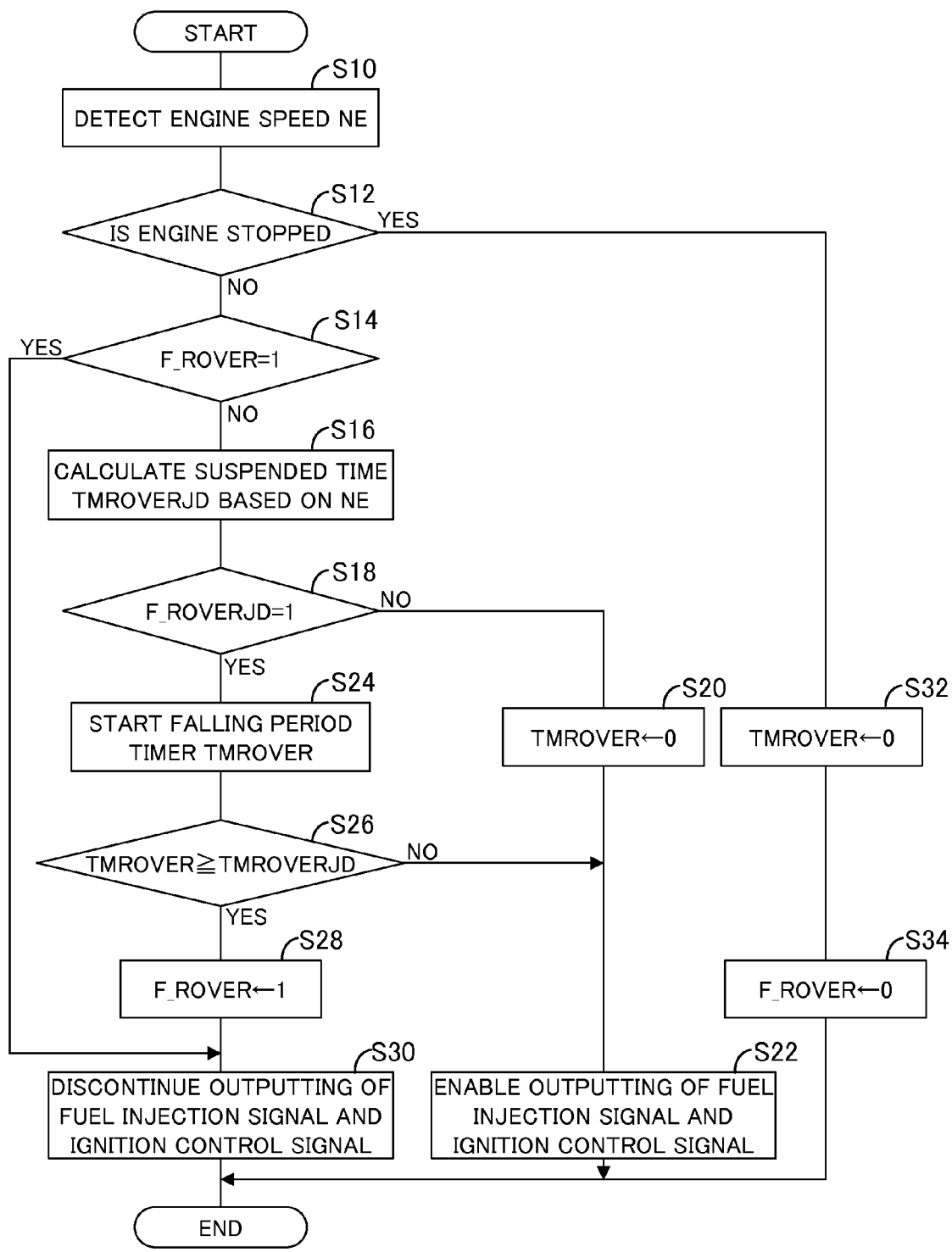
FIG. 3 is a flowchart showing the process of the operation of the apparatus shown in FIG. 1.

FIG. 3 is a flowchart showing the process of the operation of the apparatus according to this embodiment. The illustrated program is executed by the ECU 96 at predetermined interval (e.g., 100 milliseconds).

In S10, the engine speed NE is detected or calculated based on the output of the crank angle sensor 86 and in S12, it is determined whether the engine 16 is stopped. The engine 16 is determined to be stopped in S12 when the crank angle sensor 86 does not output the crank angle signal for a prescribed time period.

When the result in S12 is No, the program proceeds to S14, in which it is determined whether a bit of an engine stop completed flag F_ROVER (explained later) is 1. Since the initial value of the flag F_ROVER is 0, the result of S14 in the first program loop is No and the program proceeds to S16, in which a suspended time (predetermined time) TMROVERJD is calculated based on the detected engine speed NE. The suspended time TMROVERJD is a period of time during which the processing for stopping the engine operation is suspended after the falling of the vehicle 10.

Figure 4:
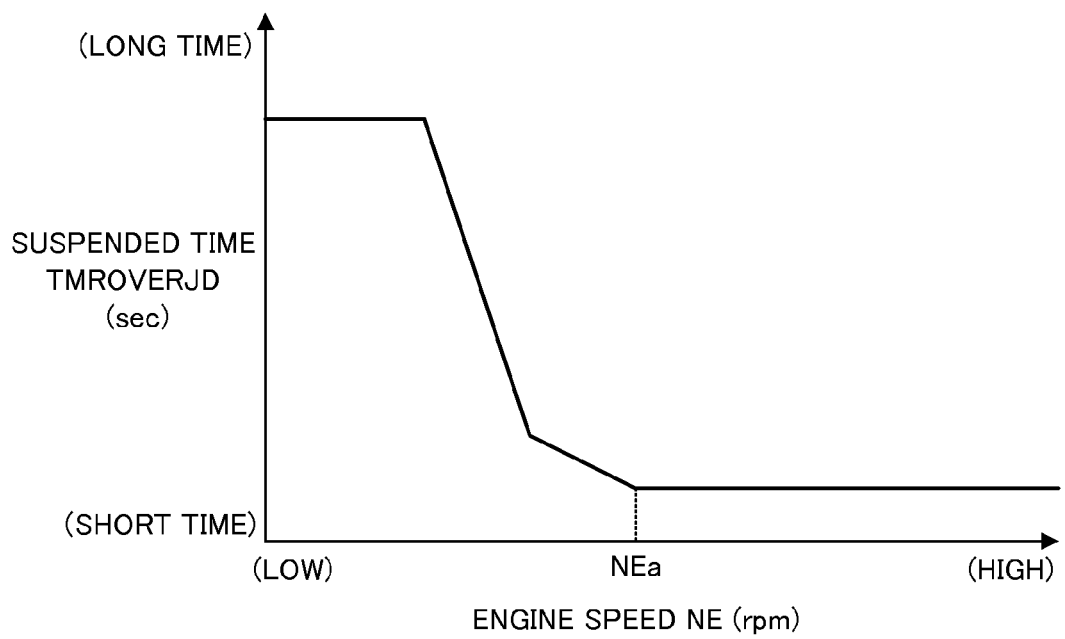
FIG. 4 is a graph showing table characteristics of suspended time with respect to engine speed, which is used in the processing of the FIG. 3 flowchart.

The suspended time TMROVERJD is obtained by retrieving table values whose characteristics are shown in FIG. 4, by using the engine speed NE. FIG. 4 is a graph showing table characteristics of the suspended time TMROVERJD with respect to the detected engine speed NE.

As shown in the drawing, the suspended time TMROVERJD is determined depending on the engine speed NE, specifically, it is relatively long when the engine speed NE is low and gradually decreases with increasing engine speed NE. When the engine speed NE is in a high speed area exceeding a predetermined engine speed NEa, the suspended time TMROVERJD remains at a constant short time period. The table data of FIG. 4 is experimentally obtained and stored in the ROM 96h beforehand.

Next, in S18, it is determined whether a bit of a falling flag F_ROVERJD is 1. A bit of the flag F_ROVERJD is set to 1 when the falling of the vehicle 10 is detected (i.e., the ON signal (falling signal) is outputted) by the tilt sensor 94 in another program (not shown), and is reset to 0 when the falling is not detected (i.e., the OFF signal is outputted).

When the result in S18 is No, the program proceeds to S20, in which a value of a falling period timer TMROVER, which is used in processing explained later, is reset to 0 and to S22, in which outputting of the fuel injection signal and ignition control signal is enabled to conduct the normal fuel ignition control and ignition timing control.

When the result in S18 is Yes, the program proceeds to S24, in which the falling period timer TMROVER (count-up timer) for measuring the time elapsed after the falling signal is outputted from the tilt sensor 94 is started. When the program proceeds to S24 in the next and ensuing program loops, since the timer TMROVER has been already started, the measurement of the elapsed time is continued to update the value of the timer TMROVER.

In S26, it is determined whether the value of the timer TMROVER is equal to or greater than the suspended time TMROVERJD. Since the first processing of S26 is conducted immediately after the timer TMROVER was started in S24, the result is normally No and outputting of the fuel injection signal and ignition control signal is enabled.

When the result in S26 is Yes in the next and ensuing program loops, the program proceeds to S28, in which a bit of the engine stop completed flag F_ROVER is set to 1 and to S30, in which outputting of the fuel injection signal and ignition control signal is discontinued, i.e., engine stop processing for stopping the operation of the engine 16 is conducted.

Thus, the engine stop processing is conducted when the suspended time TMROVERJD has elapsed after the falling of the vehicle 10, in other words, the engine stop processing conducted in response to the falling of the vehicle 10 (the falling signal of the tilt sensor 94) is suspended for the suspended time TMROVERJD based on the engine speed NE. As is clear from the above, a bit of the flag F_ROVER being set to 1 means that the engine stop processing has been conducted, while a bit thereof being 0 means that the engine stop processing is not conducted.

When a bit of the flag F_ROVER is set to 1 in S28, the result in S14 in the next program loop becomes Yes and the program proceeds to S30, in which the engine stop processing is conducted (or continued). Then, since the engine 16 was stopped, the result in S12 in the next program loop becomes Yes and the program proceeds to S32, in which a bit of the flag F_ROVER is reset to 0, thereby preparing for the next execution of the program.

Figure 5:
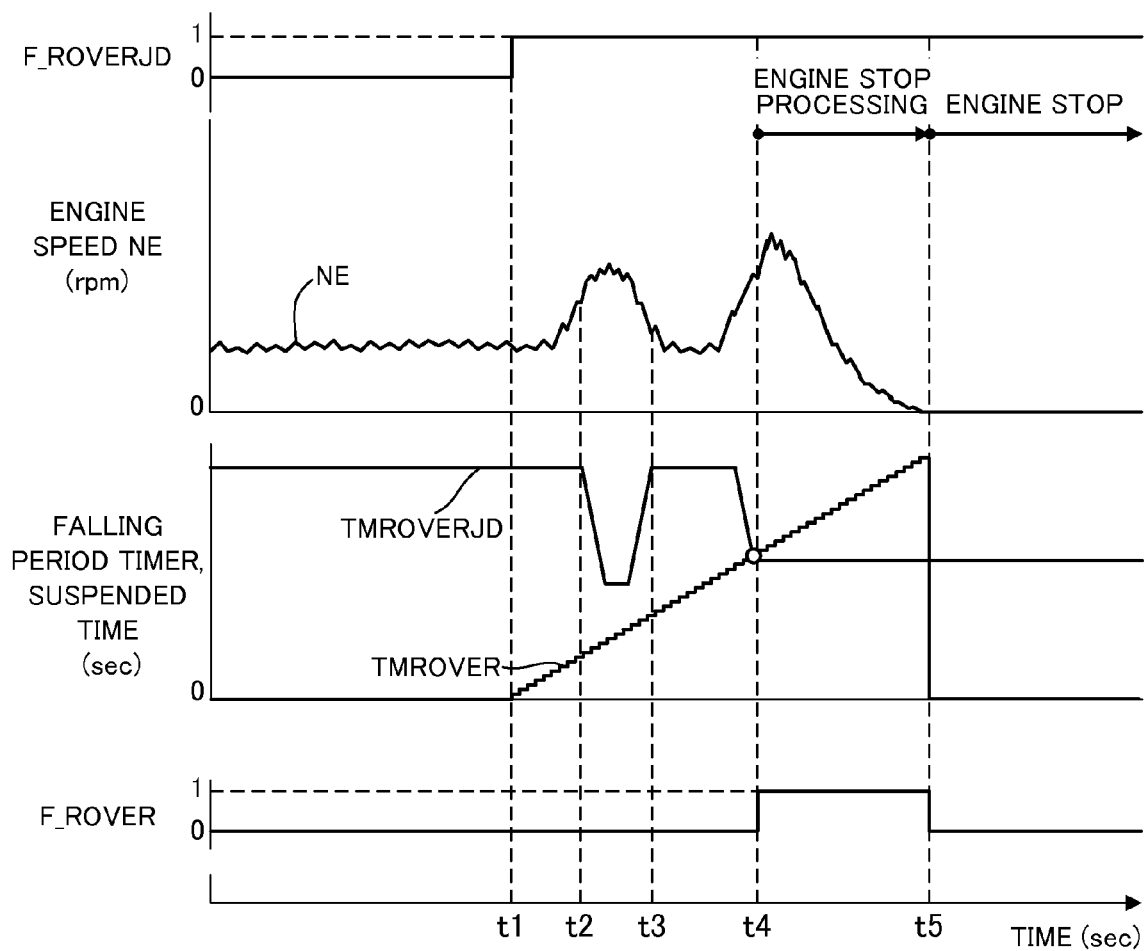
FIG. 5 is a time chart showing the operation of the apparatus shown in FIG. 1.
Figure 6:
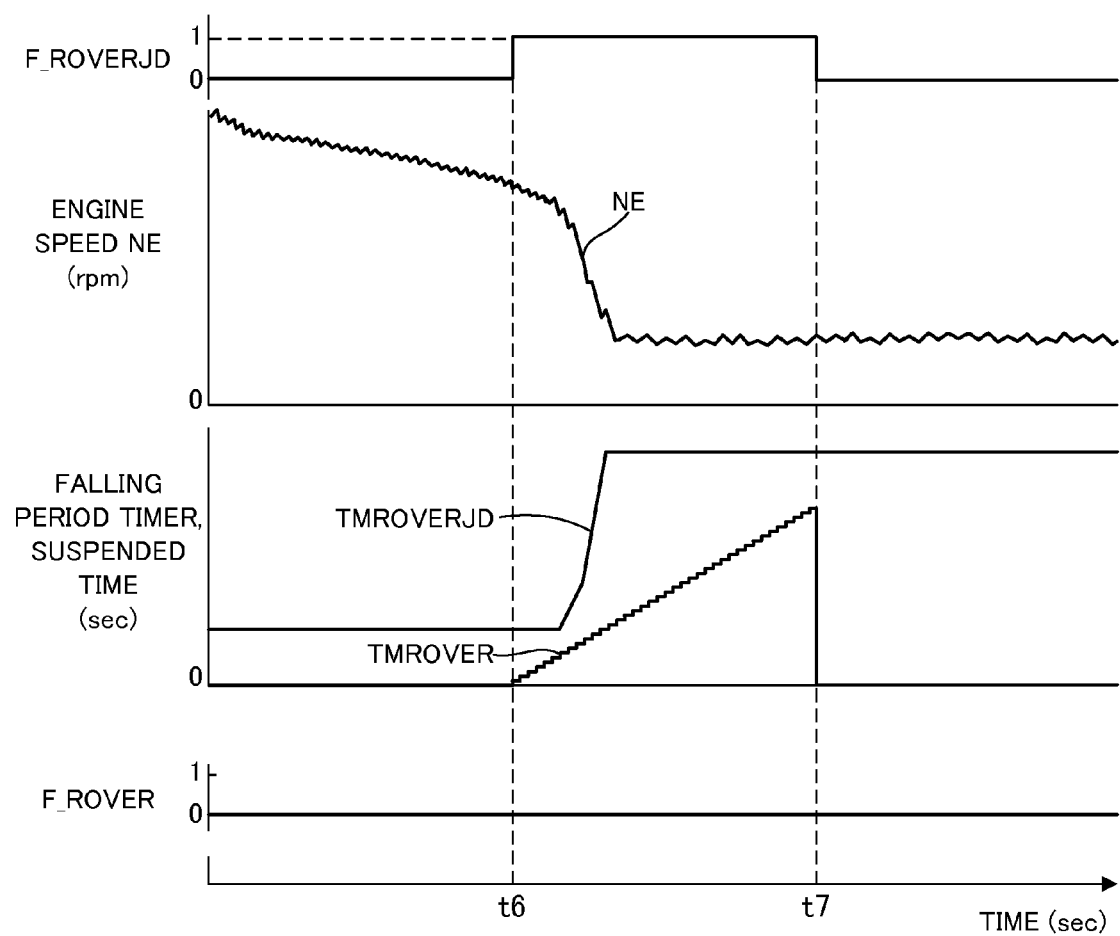
FIG. 6 is a time chart similar to FIG. 5, but showing the operation of the apparatus shown in FIG. 1.

FIGS. 5 and 6 are time charts showing the above-mentioned process. FIG. 5 shows a case where the operation of the engine 16 is stopped when the suspended time TMROVERJD has elapsed after the falling of the vehicle 10 and FIG. 6 shows a case where the vehicle 10 is lifted before the suspended time TMROVERJD elapses and the engine operation is not stopped.

As shown in FIG. 5, when the vehicle 10 falls at the time t1, a bit of the falling flag F_ROVERJD is set to 1 and the falling period timer TMROVER is started (S18, S24). After the timer TMROVER is started, as shown in the time t2 to time t3, the suspended time TMROVERJD changes in accordance with the change of the engine speed NE. To be specific, as mentioned above, the suspended time TMROVERJD is relatively long when the engine speed NE is low and gradually decreases with increasing engine speed NE.

When, at the time t4, the value of the timer TMROVER reaches or exceeds the suspended time TMROVERJD, i.e., the suspended time TMROVERJD elapses after the falling of the vehicle 10, outputting of the fuel injection signal and ignition control signal is discontinued, thereby conducting the engine stop processing, and a bit of the engine stop completed flag F_ROVER is set to 1 (S26 to S30).

When the operation of the engine 16 is stopped through the engine stop processing (time t5), the value of the timer TMROVER is reset to 0 and a bit of the flag F_ROVER is reset to 0 (S32, S34).

Next, the case of FIG. 6 is explained. When the vehicle 10 falls at the time t6, similarly to the time t1 of FIG. 5, a bit of the flag F_ROVERJD is set to 1 and the timer TMROVER is started (S18, S24).

Since, for example, the falling of the vehicle 10 is not serious, the operator lifts the vehicle 10 (at the time t7) before the suspended time TMROVERJD elapses after the falling of the vehicle 10 (i.e., when the value of the timer TMROVER is less than the suspended time TMROVERJD). In this case, a bit of the falling flag F_ROVERJD is reset to 0 (the result in S18 is No), whereafter the value of the timer TMROVER is reset to 0 and then outputting of the fuel injection signal and ignition control signal is enabled (S20, S22). Owing to this configuration, since the operation of the engine 16 is not stopped after the falling of the vehicle 10, the operator can quickly restart the vehicle 10 to travel after lifting the vehicle body.

A control apparatus for an internal combustion engine according to a second embodiment will be explained. In the second embodiment, depending on the status of the fallen vehicle 10 (such as the throttle opening and a condition of the transmission 22), the vehicle 10 may be greatly moved or shaken and it makes difficult to lift the vehicle body. Therefore, the second embodiment is configured to, in such a case, immediately stop the operation of the engine 16 to readily lift the vehicle body.

Figure 7:
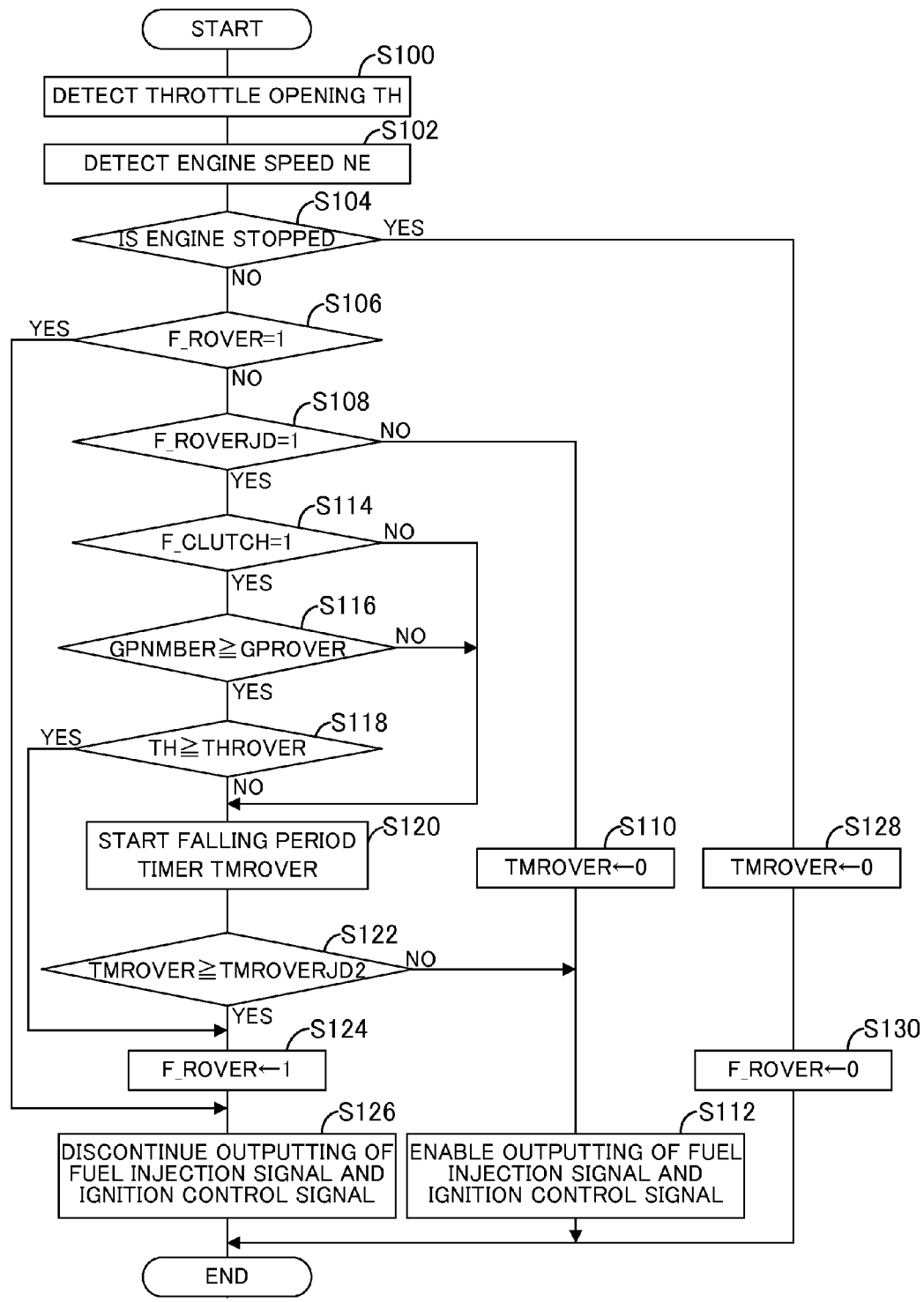
FIG. 7 is a flowchart showing the operation of a control apparatus for an internal combustion engine according to a second embodiment of this invention.

FIG. 7 is a flowchart showing the operation of a control apparatus for an internal combustion engine according to the second embodiment. The illustrated program is executed by the ECU 96 at predetermined interval (e.g., 100 milliseconds).

In S100, the throttle opening TH of the throttle valve 44 is detected or calculated based on the output of the throttle opening sensor 76. Then, in S102 to S106, the same processing is conducted as that of S10 to S14 in the FIG. 3 flowchart.

The result of S106 in the first program loop is No and the program proceeds to S108, in which it is determined whether a bit of the falling flag F_ROVERJD is 1.

When the result in S108 is No, in S110, the value of the falling period timer TMROVER is reset to 0 and in S112, outputting of the fuel injection signal and ignition control signal is enabled to conduct the normal fuel ignition control and ignition timing control.

When the result in S108 is Yes, the program proceeds to S114, in which it is determined whether a bit of a clutch engagement determination flag F_CLUTCH is 1. A bit of the flag F_CLUTCH is set to 1 when, in another program (not shown), the clutch switch 90 outputs the OFF signal indicating that the clutch 24 is in engagement (under the in-gear condition), and reset to 0 when it outputs the ON signal indicating that the clutch 24 is not in engagement.

When the result in S114 is Yes, i.e., the clutch 24 is in engagement, the program proceeds to S116, in which it is determined whether a gear position GPNMBER selected by the transmission 22 is equal to or greater than a predetermined gear position GPROVER (e.g., second gear position). The determination in S116 amounts to determining whether a current speed ratio of the transmission 22 is equal to or less than a predetermined value (e.g., 1.800 which is defined with respect to the second gear position).

When the result in S116 is Yes, in S118, it is determined whether the detected throttle opening TH is equal to or greater than a predetermined throttle opening THROVER (e.g., 20 degrees). When the result in S118 is No, the program proceeds to S120, in which the falling period timer TMROVER (count-up timer) for measuring the time elapsed after the falling of the vehicle 10 is detected is started. When the result in S114 or S116 is No, similarly the program proceeds to S120. When the result in one of S114 to S118 is No and the program proceeds to S120 in the next and ensuing program loops, since the timer TMROVER has been already started, the measurement of the elapsed time is continued to update the value of the timer TMROVER.

In S122, it is determined whether the value of the timer TMROVER is equal to or greater than a second predetermined time TMROVERJD2 (e.g., 20 seconds). Since the first processing of S122 is conducted immediately after the timer TMROVER was started in S120, the result is normally No and outputting of the fuel injection signal and ignition control signal is enabled.

When the result in S122 is Yes in the next and ensuing program loops, the program proceeds to S124, in which a bit of the engine stop completed flag F_ROVER is set to 1 and to S126, in which outputting of the fuel injection signal and ignition control signal is discontinued, i.e., the engine stop processing for stopping the operation of the engine 16 is conducted.

Thus, similarly to the first embodiment, the engine stop processing is conducted when the second predetermined time TMROVERJD2 has elapsed after the falling of the vehicle 10.

On the other hand, when the result in S118 becomes Yes before the value of the timer TMROVER reaches or exceeds the second predetermined time TMROVERJD2, the processing of S120 and S122 is skipped and the program proceeds to S124 and S126 to conduct the engine stop processing.

Specifically, it is configured such that, in S108 and S120 to S126, the engine stop processing is conducted when the second predetermined time TMROVERJD2 elapses after the falling of the vehicle 10 is detected. However, in the case where the vehicle 10 is determined to be in a predetermined condition in which the operation of the engine 16 should be stopped before the time TMROVERJD2 elapses (i.e., where the vehicle body is relatively greatly moved or shaken after falling and it is likely difficult to lift the vehicle body), the operation of the engine 16 is immediately stopped.

More specifically, the processing of S114 to S118 is conducted to determine whether the vehicle 10 is in the predetermined condition in which the engine operation should be stopped and when the results of S114 to S118 are all Yes (precisely, the throttle opening TH is equal to or greater than the predetermined throttle opening THROVER, the clutch 24 is in engagement (flag F_CLUTCH=1), and the gear position GPNMBER is equal to or greater than the predetermined gear position GPROVER (the speed ratio of the transmission 22 is at or below the predetermined value)), the vehicle 10 is determined to be in the predetermined condition and the engine stop processing is conducted regardless of the value of the timer TMROVER.

The explanation of FIG. 7 is resumed. When a bit of the flag F_ROVER is set to 1 in S124, the result in S106 in the next program loop becomes Yes and the program proceeds to S126. Then, since the engine 16 was stopped through the engine stop processing, the result in S104 in the next program loop becomes Yes and the program proceeds the same as the case of the affirmative result of S12 in the FIG. 3 flowchart in the first embodiment.

Figure 8:
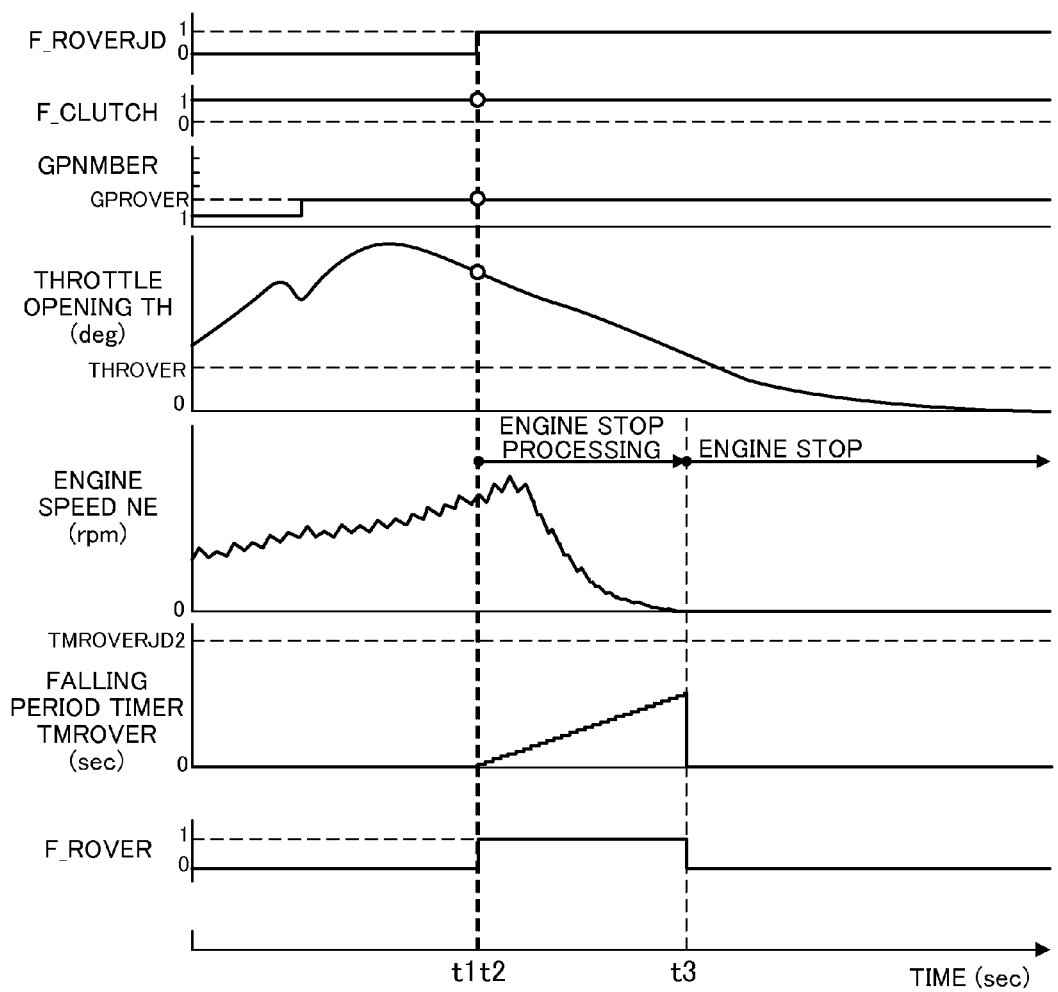
FIG. 8 is a time chart showing the operation of the apparatus shown in FIG. 7.
Figure 9:
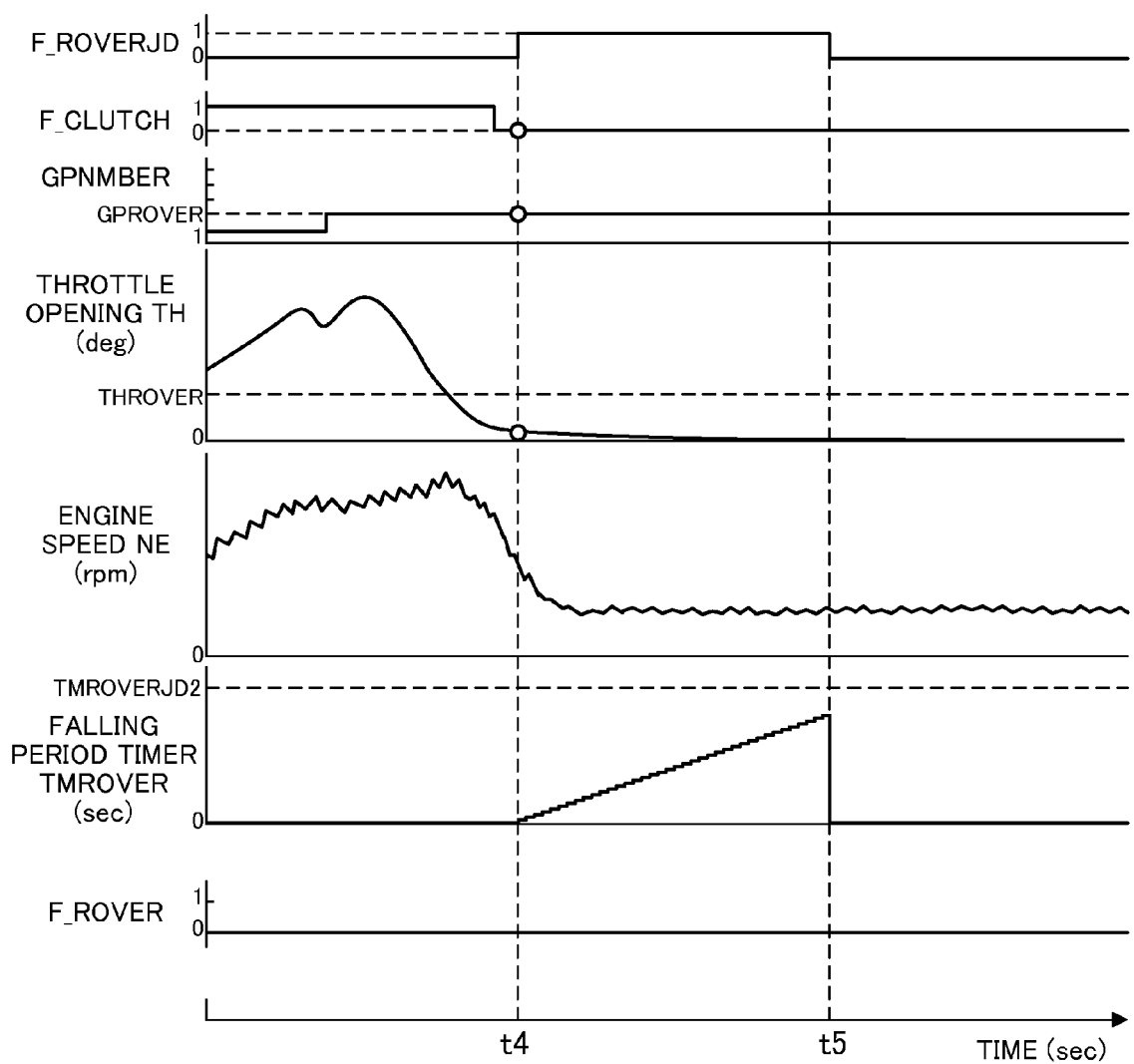
FIG. 9 is a time chart similar to FIG. 8, but showing the operation of the apparatus shown in FIG. 7.

FIGS. 8 and 9 are time charts showing the above-mentioned process. FIG. 8 shows a case where the operation of the engine 16 is stopped when the vehicle 10 is determined to be in the predetermined condition and FIG. 9 shows a case where the vehicle body is lifted before the second predetermined time TMROVERJD2 elapses after the falling of the vehicle 10 and the engine operation is not stopped.

As shown in FIG. 8, when the vehicle 10 falls at the time t1, a bit of the falling flag F_ROVERJD is set to 1 and the falling period timer TMROVER is started (S108, S120). When the vehicle 10 is determined to be in the predetermined condition at the time t2 which is before the second predetermined time TMROVERJD2 elapses (i.e., before the value of the timer TMROVER reaches or exceeds the time TMROVERJD2), outputting of the fuel injection signal and ignition control signal is discontinued to conduct the engine stop processing, while a bit of the engine stop completed flag F_ROVER is set to 1 (S114 to S118, S124, S126).

When the operation of the engine 16 is stopped through the engine stop processing (time t3), the value of the timer TMROVER is reset to 0 and a bit of the flag F_ROVER is reset to 0 (S128, S130).

Next, the case of FIG. 9 is explained. When the vehicle 10 falls at the time t4, similarly to the time t1 of FIG. 8, a bit of the flag F_ROVERJD is set to 1 and the timer TMROVER is started (S108, S120).

In the case where the vehicle 10 is determined to be not in the predetermined condition because, for instance, the throttle opening TH is less than the predetermined throttle opening THROVER and the clutch 24 is not in engagement, in other words, in the case where the vehicle body is lifted by the operator before the time TMROVERJD2 elapses because it is not assumed to be difficult to lift the fallen vehicle body based on the condition of the vehicle 10 (at the time t5), since a bit of the falling flag F_ROVERJD is reset to 0 (the result in S108 is No), the value of the timer TMROVER is reset to 0 and outputting of the fuel injection signal and ignition control signal is enabled to continue the operation of the engine 16 (S110, S112). Owing to this configuration, the operator can restart the vehicle 10 to drive immediately after lifting the vehicle body.

The remaining configuration is the same as that in the first embodiment.

As stated above, in the first and second embodiments, it is configured to have an apparatus for controlling an internal combustion engine (16) mounted on a vehicle (10), comprising: a falling signal generator (falling signal generating unit; tilt sensor 94) that generates a falling signal indicative of falling of the vehicle when the vehicle falls; an operation stopper (operation stopping unit; ECU 96, S30, S126) that stops operation of the engine in response to the generated falling signal; and a suspender (suspending unit; ECU 96, S24, S26, 5120, 5122) that suspends processing of the operation stopper to stop the operation of the engine until a predetermined time period (suspended time TMROVERJD, second predetermined time TMROVERJD2) elapses.

With this, when the falling of the vehicle 10 is not serious and the operator lifts the vehicle body within the predetermined time period TMROVERJD (second predetermined time TMROVERJD2), since stopping the operation of the engine 16 by the engine operation stopper is suspended, i.e., the operation of the engine 16 is continued, the operator can restart the vehicle 10 to drive immediately after lifting the vehicle body. Further, the restarting operation of the vehicle 10 (i.e., manipulation of the kick starter pedal, etc.) after the falling thereof is not needed, thereby avoiding great time loss and decreasing a physical burden on the operator (driver).

Furthermore, since the operation of the engine 16 is stopped upon the elapse of the predetermined time period TMROVERJD (second predetermined time TMROVERJD2) after the falling of the vehicle 10, pressurized circulation of lubricating oil of the engine 16 can avoid from being adversely affected by, for example, the lean of the vehicle, thereby preventing damage of the engine 16. As a result, even when the vehicle 10 falls, it becomes possible to achieve both prevention of damage of the engine 16 and immediate restart of driving of the vehicle 10.

In the first embodiment, the apparatus further includes an engine speed detector (engine speed detecting unit; crank angle sensor 86) that detects speed of the engine (engine speed NE), and the suspender sets the predetermined time period (TMROVERJD) in accordance with the detected engine speed NE (S16). With this, since the predetermined time period TMROVERJD can be set in accordance with the operating condition of the engine 16, it becomes possible to stop the operation of the engine 16 at the appropriate timing after the falling of the vehicle 10 and reliably prevent damage of the engine 16.

In the apparatus, the suspender sets the predetermined time period (TMROVERJD) to decrease with increasing of the detected engine speed NE (S16). With this, since the more suitable predetermined time period TMROVERJD can be set in accordance with the operating condition of the engine 16, it becomes possible to stop the operation of the engine 16 at the further appropriate timing after the falling of the vehicle 10.

In the second embodiment, the apparatus further includes a vehicle condition determiner (vehicle condition determining unit; ECU 96, S114 to S118) that determines whether the vehicle is in a predetermined condition in which the operation of the engine should be stopped, and the operation stopper stops the operation of the engine when the vehicle is determined to be in the predetermined condition before the predetermined time period (second predetermined time TMROVERJD2) elapses. With this, when the vehicle body is relatively greatly moved or shaken after the falling and it is likely difficult to lift the vehicle body, it becomes possible to stop the operation of the engine 16 at the appropriate timing in accordance with the fallen vehicle condition, thereby easily lifting the vehicle body to readily restart the vehicle 10 to drive.

The apparatus further includes a throttle opening detector (throttle opening detecting unit; throttle opening sensor 76) that detects throttle opening (TH) of a throttle valve (44) of the engine, and the vehicle condition determiner determines that the vehicle is in the predetermined condition when the detected throttle opening is equal to or greater than a predetermined throttle opening (THROVER). With this, it becomes possible to accurately determine that the fallen vehicle 10 is in the predetermined condition in which the operation of the engine 16 should be stopped by detecting the throttle opening TH, thereby stopping the engine operation at the further appropriate timing.

The apparatus further includes a transmission (22) that varies an output of the engine in rotational speed; and a speed ratio detector (speed ratio detecting unit; gear position sensor 92) that detects a speed ratio of the transmission, and the vehicle condition determiner determines that the vehicle is in the predetermined condition when the detected speed ratio is equal to or less than a predetermined value (i.e., when the gear position GPNMBER is equal to or greater than the predetermined gear position GPROVER). With this, it becomes possible to determine more accurately that the fallen vehicle 10 is in the predetermined condition in which the operation of the engine 16 should be stopped by using the speed ratio of the transmission 22, thereby stopping the engine operation at the still further appropriate timing.

The apparatus further includes a clutch (24) that is interposed between the engine and the transmission to transmit the output of the engine when being engaged; and a clutch engagement determiner (clutch engagement determining unit; clutch switch 90) that determines whether the clutch is engaged, and the vehicle condition determiner determines that the vehicle is in the predetermined condition when the clutch is determined to be engaged and the detected speed ratio is equal to or less than the predetermined value. With this, it becomes possible to determine still more accurately that the fallen vehicle 10 is in the predetermined condition in which the operation of the engine 16 should be stopped by using the engagement condition of the clutch 24 and the speed ratio of the transmission 22.

It should be noted that the second predetermined time PMROVERJD2 in the second embodiment can be not constant but variable depending on the engine speed NE as in the first embodiment.

It should also be noted that, although the falling of the vehicle 10 is detected by the tilt sensor 94 having the pendulum, an acceleration sensor or the like can be used instead. Further, the speed ratio of the transmission 22 detected based on the signal from the gear position sensor 92 above can be calculated or detected based on the engine speed NE, vehicle speed, etc., in place thereof.

It should also be noted that, although the predetermined gear position GPROVER (the predetermined value to be compared with the speed ratio of the transmission22), predetermined throttle opening THROVER, predetermined time TMROVERJD (TMROVERJD2), displacement of the engine 10, etc., are indicated with specific values in the foregoing, they are only examples and not limited thereto.

It should also be noted that the motorcycle is used as an example of the vehicle 10, but it is not limited thereto and can be another type of saddle-seat vehicle such as a scooter, ATV (All Terrain Vehicle) or the like, a seat or saddle of which the operator straddles, or any other type of vehicle such as four-wheel vehicle.

Japanese Patent Application Nos. 2009-063205 and 2009-063206 both filed on Mar. 16, 2009, are incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling an internal combustion engine mounted on a vehicle, comprising:
   a falling signal generator that generates a falling signal indicative of falling of the vehicle when the vehicle falls;
   an operation stopper that stops operation of the engine in response to the generated falling signal;
   a suspender that suspends processing of the operation stopper to stop the operation of the engine until a predetermined time period elapses; and
   an engine speed detector that detects speed of the engine; wherein the suspender sets the predetermined time period to decrease with increasing of the detected engine speed.

2. An apparatus for controlling an internal combustion engine mounted on a vehicle, comprising:
- a falling signal generator that generates a falling signal indicative of falling of the vehicle when the vehicle falls;
- an operation stopper that stops operation of the engine in response to the generated falling signal;
- a suspender that suspends processing of the operation stopper to stop the operation of the engine until a predetermined time period elapses; and
- a vehicle condition determiner that determines whether the vehicle is in a predetermined condition in which the operation of the engine should be stopped,
- wherein the operation stopper stops the operation of the engine when the vehicle is determined to be in the predetermined condition before the predetermined time period elapses.

3. The apparatus according to claim 2, further including:
a throttle opening detector that detects throttle opening of a throttle valve of the engine, and
the vehicle condition determiner determines that the vehicle is in the predetermined condition when the detected throttle opening is equal to or greater than a predetermined throttle opening.

4. The apparatus according to claim 3, further including:
a transmission that varies an output of the engine in rotational speed;
a speed ratio detector that detects a speed ratio of the transmission, and
the vehicle condition determiner determines that the vehicle is in the predetermined condition when the detected speed ratio is equal to or less than a predetermined value.

5. The apparatus according to claim 2, further including:
a transmission that varies an output of the engine in rotational speed;
a speed ratio detector that detects a speed ratio of the transmission, and
the vehicle condition determiner determines that the vehicle is in the predetermined condition when the detected speed ratio is equal to or less than a predetermined value.

6. The apparatus according to claim 5, further including:
a clutch that is interposed between the engine and the transmission to transmit the output of the engine when being engaged;
a clutch engagement determiner that determines whether the clutch is engaged, and
the vehicle condition determiner determines that the vehicle is in the predetermined condition when the clutch is determined to be engaged and the detected speed ratio is equal to or less than the predetermined value.

* * * * *